US009759907B2

(12) United States Patent
Danehy

(10) Patent No.: US 9,759,907 B2
(45) Date of Patent: Sep. 12, 2017

(54) RAPID OPTICAL SHUTTER, CHOPPER, MODULATOR AND DEFLECTOR

(71) Applicant: THE UNITED STATES OF AMERICA, AS REPRESENTED BY THE ADMINISTRATOR OF THE NASA, Washington, DC (US)

(72) Inventor: Paul M. Danehy, Newport News, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

(*) Notice: Subject to any disclaimer, the term of this patent is extended or adjusted under 35 U.S.C. 154(b) by 0 days.

(21) Appl. No.: 15/007,796

(22) Filed: Jan. 27, 2016

(65) Prior Publication Data
US 2016/0216507 A1 Jul. 28, 2016

Related U.S. Application Data

(60) Provisional application No. 62/108,570, filed on Jan. 28, 2015.

(51) Int. Cl.
*G01N 21/00* (2006.01)
*G02B 26/04* (2006.01)
(Continued)

(52) U.S. Cl.
CPC ............ *G02B 26/04* (2013.01); *G02B 5/005* (2013.01); *G02B 26/0833* (2013.01); *G03B 9/08* (2013.01); *G03B 17/17* (2013.01); *H04N 5/2256* (2013.01)

(58) Field of Classification Search
CPC ............ G01N 21/1702; G01N 21/171; G01N 21/1717; G01N 21/255; G01N 29/2418
(Continued)

(56) References Cited

U.S. PATENT DOCUMENTS

2005/0083523 A1* 4/2005 Senturia .................... G01J 3/42
356/323
2007/0147730 A1* 6/2007 Wiltberger .......... A61F 9/00817
385/16

(Continued)

FOREIGN PATENT DOCUMENTS

CA WO2005031434 4/2005

OTHER PUBLICATIONS

Lee, Benjamin, "DMD 101: Introduction to Digitial Micromirror Device (DMD Technology)," Application Report, DLPA008A—Jul. 2008—Revised Oct. 2013, pp. 1-11.
(Continued)

*Primary Examiner* — Tarifur Chowdhury
*Assistant Examiner* — Md M Rahman
(74) *Attorney, Agent, or Firm* — Jonathan B. Soike; Andrea Z. Warmbier; Mark P. Dvorscak

(57) ABSTRACT

An optical device with a light source and a detector is provided. A digital micromirror device positioned between the detector and the light source may deflect light beams projected from the light source. An aperture in front of the detector may block an incoming light beam from the detector when the incoming light beam is incident on the detector outside of a passable incident range and including an aperture opening configured to pass the incoming light beam to the detector when the incoming light beam is incident on the detector within a passable incident range. The digital micromirror device may rotate between a first position causing the light beam to pass through the aperture opening and a second
(Continued)

position causing the light beam to be blocked by the aperture. The optical device may be configured to operate as a shutter, chopper, modulator and/or deflector.

20 Claims, 5 Drawing Sheets

(51) Int. Cl.
    *G02B 26/08* (2006.01)
    *G02B 5/00* (2006.01)
    *G03B 17/17* (2006.01)
    *G03B 9/08* (2006.01)
    *H04N 5/225* (2006.01)

(58) Field of Classification Search
    USPC .......................................................... 356/432
    See application file for complete search history.

(56) References Cited

U.S. PATENT DOCUMENTS

| | | | |
|---|---|---|---|
| 2009/0123146 A1* | 5/2009 | Li ........................ | H04B 10/035 398/4 |
| 2012/0140218 A1* | 6/2012 | Jin ..................... | G01N 21/3103 356/315 |
| 2014/0070700 A1* | 3/2014 | Genthon ............ | H05B 33/0854 315/83 |
| 2014/0226040 A1* | 8/2014 | Okada .................. | H04N 5/2256 348/239 |
| 2015/0054937 A1* | 2/2015 | Lippert .............. | G02B 21/0028 348/80 |
| 2015/0201902 A1* | 7/2015 | Zhu .......................... | A61B 8/12 600/443 |

OTHER PUBLICATIONS

TI DIP® technology overview, DLP® Products & MEMS, Accessed on Jan. 27, 2016, http://www.ti.com/lsds/ti/analog/dlp/overview.page.
Miles, P. C. et al., "A fast mechanical shutter for spectroscopic applications," Meas. Sci. Technol., 2000, pp. 392-397, vol. 11, UK.
Kuo, Dawei, "Laser Doppler Velocimetry: Flow Measurement Using a Digital Micromirror Device," Jun. 11, 2014, pp. Kuo 1-21.
TI DLP® Application Report, DLPA022, "DLP System Optics," Accessed on Jan. 27, 2016, http://www.ti.com/lit/an/dlpa022/dlpa022.pdf, Jul. 2010, pp. 1-26.
TI DLP® White Paper, DLPA-27, "Laser Power Handling for DMDs." Accessed on Jan. 27, 2016, http://www.ti.com/lit/wp/dlpa027/dlpa027.pdf, Jan. 2012, pp. 1-11.
TI DLP® Laser & DLP, TI DN 2509927, "Using Lasers with DLP DMD Technology," Accessed on Jan. 27, 2016, http://www.ti.com/lit/wp/dlpa037/dlpa037.pdf, Sep. 2008, pp. 1-10.
TI DLP® TI E2E, DLP Products & MEMS, "Maximum Power Density for DLP Lightcrafter," Accessed on Jan. 27, 2016, http://e2e.ti.com/support/dlp_mems_micro-electro-mechanical_systems/f/850/t/297372.aspx.
TI DLP®, DLP Products & MEMS, Tools & Software, Accessed on Jan. 27, 2016, http://www.ti.com/lsds/ti/analog/dlp/tools-software.page.
Chandrasekaran, Sri Nivas et al., "Using Digital Micromirror Devices for Focusing Light Through Turbid Media," Proc. of SPIE, 2014, pp. 897905-1-897905-10, vol. 8979.
Gong, Lei et al., "Generation of Nondiffracting Bessel Beam using Digital Micromirror Device," Applied Optics, Jul. 1, 2013, pp. 4566-4575, vol. 52, No. 19.
Bhuyan, Anshuman et al., "Integrated Circuts for Volumetric Ultrasound Impaging With 2-D CMUT Arrays," IEEE Transactions on Biomedical Circuits and Systems, Dec. 2013, pp. 796-804, vol. 7, No. 6.
Kheradvar, Arash et al., "Echocardiographic Particle Image Velocimetry: A Novel Technique for Quantification of Left Ventricular Blood Vorticity Pattern," Journal of the American Society of Echocardiograpy, Jan. 2010, pp. 87-94, vol. 23, No. 1.
Danehy, Paul M. et al., "DMD and CMUT Technologies, Sample Papers for Brainstorm on Possible Applications to Flow Metrology," National Institute of Aerospace and National Aeronautics and Space Administration, Sep. 5, 2014, pp. 1-12.

\* cited by examiner

RAPID OPTICAL SHUTTER, CHOPPER, MODULATOR AND DEFLECTOR

CROSS-REFERENCE TO RELATED PATENT APPLICATION(S)

This patent application claims the benefit of and priority to U.S. Provisional Patent Application No. 62/108,570, filed on Jan. 28, 2015, the contents of which are hereby incorporated by reference in their entirety.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

TECHNICAL FIELD

Aspects of this disclosure generally relate to systems and methods for optical devices and in particular relate to rapid optical shutters, choppers, modulators, and deflectors employing digital micromirror devices.

BACKGROUND OF THE INVENTION

There are numerous applications in which an optical source, e.g., laser or light beam, may be need to be shuttered (rapidly turned on and off), chopped, modulated (spatially or temporally), or deflected. One such example is consumer grade photography where rapid shutter speed prevents the camera from being over exposed and prevents blurring. In various other applications, shuttering needs to be done rapidly to improve signal to noise ratio or improve performance of the optical device being used. Current methods have limited speeds and are excessively large and/or expensive.

Prior solutions for optical devices have not resolved the need for an approach to perform one or more of the above actions without drawbacks, e.g., optically and electrically inefficient, size constraints, and/or cost-prohibitive. Therefore, there is a need for optical device systems and methods that address one or more of the deficiencies described above amongst others.

BRIEF SUMMARY OF THE INVENTION

The following presents a general summary of aspects of this invention in order to provide a basic understanding of at least some aspects of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects relate to an optical device including a light source, a detector, a digital micromirror device and an aperture. The light source may be configured to project a light beam. The detector may be configured to detect an incident light beam from the light source. The digital micromirror device may be disposed at a position between the detector and the light source and may be configured to deflect the light beam projected from the light source. The aperture may be disposed in front of the detector and may be configured to block an incoming light beam from the detector when the incoming light beam is incident on the detector outside of a passable incident range. The aperture may include an aperture opening configured to pass the incoming light beam to the detector when the incoming light beam is incident on the detector within a passable incident range. The digital micromirror device may be configured to rotate some or all of its mirrors between a first position and a second position, the first position causing the light beam to pass through the aperture opening to the detector, and the second position causing the light beam to be blocked by the aperture.

In certain aspects, the digital micromirror device may include an optical shutter to rapidly deflect the incoming light beam to the detector via the aperture, e.g., with a repetition rate on the order a kilohertz. The optical shutter may be configured to reject ambient light. The light source may include a laser beam directed into a flame and a lens configured to collect scattered light from the laser beam passing through the flame and to direct the scattered light to the detector. A mirror may be disposed between the digital micromirror device and the detector and may be configured to deflect the scattered light collected by the lens toward the detector. In some embodiments, when the digital micromirror device is positioned in the second position, luminosity from the flame may be blocked from entering the detector.

In certain embodiments, the light beam may operate at a repetition rate of between 10 kilohertz and 32 kilohertz. In some embodiments, the light beam may operate at a repetition rate less than 10 kilohertz (e.g., on the order of 1 kilohertz). Still in some embodiments, the light beam may operate at a repetition rate greater than 32 kilohertz. In some aspects, the opening of the aperture may be approximately 0.95 inches. In some aspects, the opening of the aperture may be less than 0.95 inches or greater than 0.95 inches. A plurality of the optical devices as discussed herein may be connected in series or in parallel. In some aspects, a camera body may be included to house the detector, the light source, the digital micromirror device and the aperture, and the optical device may be configured for imaging. A laser beam safety system configured to block the light source from the digital micromirror device may be included in certain embodiments.

Further aspects relate to an optical device including a detection system that includes a light beam receiving portion configured to detect a light beam. A digital micromirror device may be configured to deflect a light beam toward the detection system. An aperture may be disposed proximate to the light beam receiving portion. The aperture may include an aperture opening configured to allow passage of the light beam deflected from the digital micromirror device to the detection system and an aperture segment configured to block passage of the light beam deflected from the digital micromirror device from the detection system. The digital micromirror device may be configured to adjust between at least a first position and a second position, the first position causing the light beam to pass through the aperture opening to the detection system, and the second position causing the light beam to strike the aperture segment.

In certain embodiments, the digital micromirror device may be configured temporally or spatially modulate the light beam and/or to control a temporal or spatial mode of the light beam. A temporal or spatial modulation of the digital micromirror device may correspond to encoded information. The encoded information may represent at least one of an image, an audio, a video, or an archival for data storage. In some embodiments, a sample may be included and the light beam may pass through the sample before being passed to the detection system. A detection system may include a lock-in electronics system to detect an oscillating signal passing through the sample. The light beam may include a continuous wave beam, and the digital micromirror device may oscillate such that the continuous wave beam is chopped into a series of low-energy laser pulses. At least one amplifier stage may be included for amplifying the low-energy laser pulses.

These and other features, advantages, and objects of the present invention will be further understood and appreciated by those skilled in the art by reference to the following specification, claims, and appended drawings.

DETAILED DESCRIPTION OF THE INVENTION

In the following description of various examples of the invention, reference is made to the accompanying drawings which show, by way of illustration, various example systems and environments in which aspects of the present disclosure may be practiced. It is to be understood that other specific arrangements of parts, example systems, and environments may be utilized and structural and functional modifications may be made without departing from the scope of this disclosure.

In addition, the present disclosure is described in connection with one or more embodiments. The descriptions set forth below, however, are not intended to be limited only to the embodiments described. To the contrary, it will be appreciated that there are numerous equivalents and variations that may be selectively employed that are consistent with and encompassed by the disclosures below.

The present disclosure relates to an optical device, also referred to as an optical shutter, chopper, modulator, or deflector, employing a digital mirror device or a digital micromirror device (a DMD). Accordingly, the optical device may be configured for a number of various applications.

Figure 1:
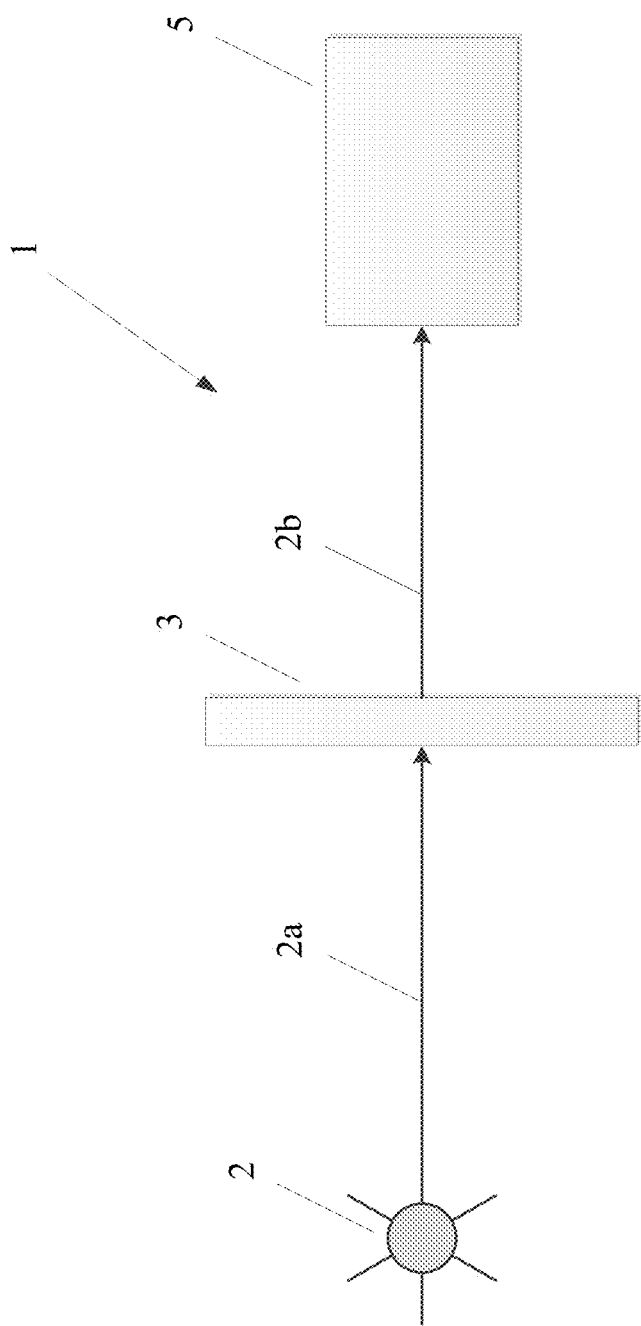
FIG. 1 is a schematic view of a known optical device.

Referring to FIG. 1, a known optical device 1 is shown. A light beam 2a projected from light source 2 is incident on a detector 5 (e.g., a camera). As discussed herein, "light" may refer to any type of light, e.g., a laser, a light emitting diode, and the like. Light beam 2a from light source 2 passes through an aperture, e.g., a shutter 3, which is configured to open and then close in order to limit an amount of light 2b reaching the detector 5. There are limitations on the speed, size and cost associated with apertures such as shutter 5 of FIG. 1.

Figure 2:
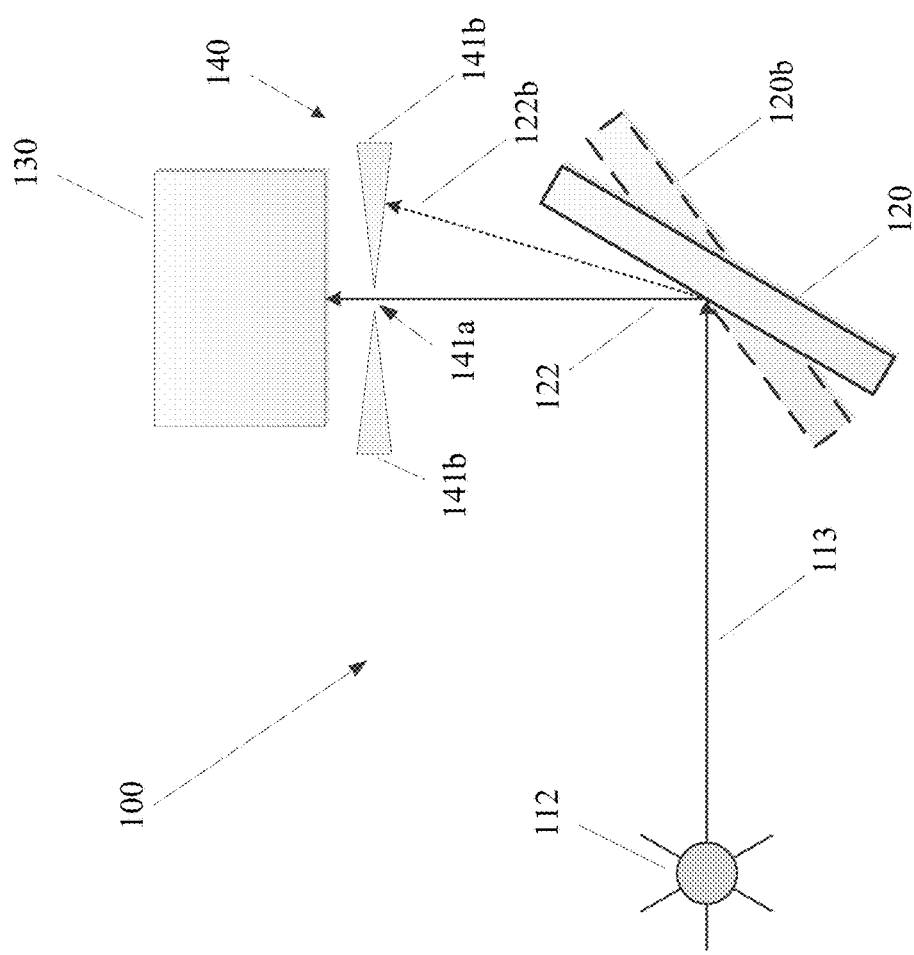
FIG. 2 is a schematic view of an optical device in accordance with an embodiment.

Referring to FIG. 2, an example schematic implementation of an optical device 100 according to an embodiment of the present disclosure is shown. Optical device 100 may employ digital light processing (DLP) micromirror technology to rapidly deflect an incoming light beam on to an aperture, e.g., with repetition rates on the order a kilohertz. In some instances, optical devices may be employed with a repetition rate as low as a fraction of 1 Hz and up to 20 kHz and beyond. Still in some instances, optical devices may be configured to have a repetition rate of at least 1 kHz, as much as 20 kHz, as much as 30 kHz, or higher than 30 kHz, without departing from the scope of the present disclosure. For example, light beam 113 may project from light source 112 toward a digital micromirror device 120.

Figures 5A, 5B:
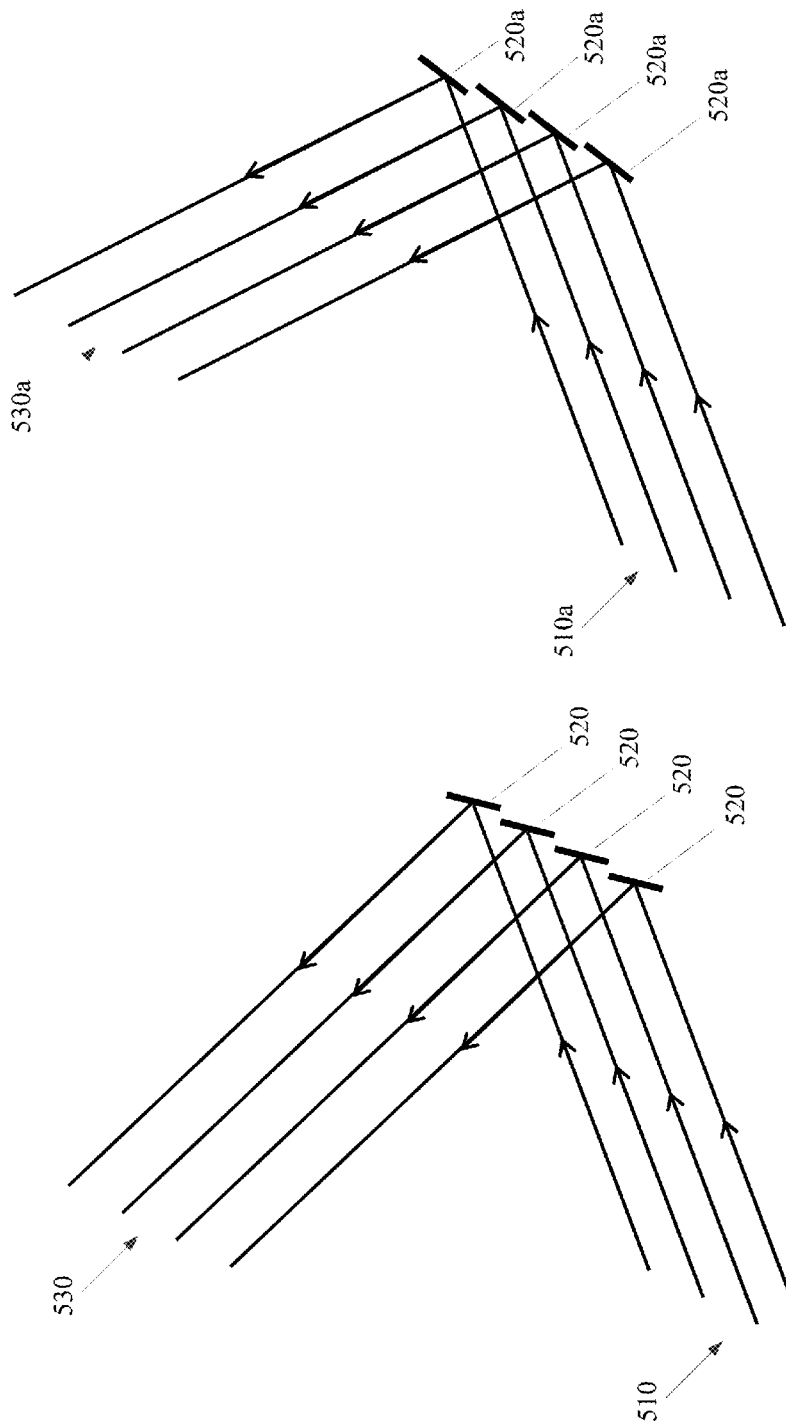
FIGS. 5A and 5B are schematic views of micromirrors of a digital micromirror device in accordance with one of more aspects of the present disclosure.

While not shown in the schematic representation of FIG. 2, digital micromirror device 120 may include a plurality (e.g., thousands) of small mirrors (not shown). A tilt angle of each of the mirrors may be individually digitally driven. For example, FIGS. 5A and 5B schematically depict an array of a plurality of micromirrors 520, 520a which may be included in digital micromirror device 120. When the micromirrors 520 are positioned in a first positon as shown in FIG. 5A, incoming light beams 510 strike micromirrors 520 and micromirrors 520 deflect deflected light beam 530 at a first angle. When the micromirrors 520a are tilted or pivoted about an axis so as to be positioned in a second positon as shown in FIG. 5B, incoming light beams 510a strike micromirrors 520a and micromirrors 520a deflect deflected light beam 530a at a second angle that is different that the first angle. Accordingly, an optical device including a digital micromirror device as discussed herein may be configured to control an amount of a light source which reaches a detector by tilting or rotating one or more of the plurality of micromirrors 520, 520a.

For example, certain digital micromirror devices are described in "DMD 101: Introduction to Digital Micromirror Device (DMD) Technology;" Benjamin Lee, Texas Instruments, Application Report 2008, which is incorporated by reference herein in its entirety. A digital micromirror device includes an array of micromirrors or pixels (also referred to as a DMD pixel). A DMD pixel is both an opto-mechanical element and an electro-mechanical element. The DMD pixel is an electro-mechanical element in that there are two stable micromirror states (e.g., +12° and −12°) that are determined by geometry and electrostatics of the pixel during operation. The DMD pixel is an opto-mechanical element in that these two positions determine the direction that light is deflected. In particular, the DMD may be a spatial light modulator. By convention, the positive (+) state is tilted toward the illumination and is referred to as the "on" state (the shutter open state). Similarly, the negative (−) state is tilted away from the illumination and is referred to as the "off" state (the shutter closed state). In many digital micromirror devices, there are the only two operational states. Mechanically the DMD pixel includes a micromirror attached to a hinge, for titling from a first (e.g., positive) state to a second (e.g., negative) state.

In accordance with various embodiments of the present disclosure, digital micromirror device 120 deflects the light beam in the direction of aperture 140. While digital micromirror device 120 is schematically depicted in FIG. 2 as a single micromirror device, one skilled in the art would understand that digital micromirror device may include a plurality of micromirrors. Depending on where the light beam strikes along the aperture 140, the light beam may be blocked by aperture segment 141b, e.g., as shown by light beam 122b of FIG. 2, or the light beam may pass through aperture opening 141a to reach detector 130, e.g., as shown by light beam 122 of FIG. 2. Specifically, digital micromirror device 120 may comprise at least one reflective surface or micromirror and may be rotatable, such as about a hinged point. When the digital micromirror device 120 is positioned at a first position (e.g., when at least one micromirror of digital micromirror device 120 is positioned at the first position), a deflected light beam may be directed to the aperture opening 141a, whereas when the digital micromirror device 120 is positioned as a second position (e.g., when at least one micromirror of digital micromirror device 120 is positioned at the second position), a deflected light beam may be directed to aperture segment 141b. In some embodiments, the digital micromirror device 120 may be configured such that at least one of the micromirrors naturally locks at the first position and at the second position, but not at positions therebetween. In some embodiments, at least one of the micromirrors the digital micromirror device may be configured to rotate and lock in to additional positions, e.g., a third position, a fourth position and so on. Still in other embodiments, at least one of the micromirrors the digital micromirror device may be configured to freely rotate about an axis without specific locking stages or positions, without departing from the scope of the present disclosure.

Optical devices according the present disclosure (e.g., optical device 100 of FIG. 2) may be employed to acquire high sample rate data at closely spaced positions and, accordingly, may be nearly 3 orders of magnitudes faster, i.e., for shorter exposure time, than similar-sized apertures of conventional mechanical shutters (e.g., the optical device 1 of FIG. 1). Further, optical devices according the present disclosure may be 1-2 orders of magnitude smaller and more inexpensive than higher-performing custom made shutters, as well be described further herein. Moreover, optical devices according to the present disclosure have numerous scientific, as well as consumer, medical, communication, information technology and industrial, applications. In particular, devices according to the present disclosure may be used as optical shutters, as spatial and/or temporal modulators, as beam deflectors/slicers/shapers, and the like.

Optical Shutter Applications

Optical shutters, in accordance with certain embodiments of the present disclosure, may be employed for rejection of ambient light in optical measurement experiments including, but not limited to, Raman scattering and CARS (coherent anti-Stokes Raman) spectroscopy, and imaging experiments such as laser-induced fluorescence and laser induced incandescence (LII). Optical shutters according to the present disclosure may also be used for preventing blurring in photography, digital photography, and/or scientific imaging like laser-induced fluorescence. Another use for optical shutters in accordance with the present disclosure is for blocking laser light for laser safety wherein when an interlock is tripped, the beam is safely directed to a beam dump instead of passing to the experiment. However, additional applications for the optical device may be envisioned beyond the examples presented herein, and without departing from the scope of the present disclosure.

Certain optical shutters that are commonly used, e.g., in most conventional cameras, are petal leaf type shutters. In petal leaf type shutters, several petal-shaped pieces of thin, light metal move simultaneously to open and close a viewing port (an aperture) simultaneously, thereby either blocking the light when the viewing port is closed, or transmitting the light when the viewing port is opened. However, these types of mechanical optical shutters have limited speed, e.g., they are relatively large and take time to open and to close. Generally, the larger the shutter, the longer it takes to open and close. Such devices often have a limitation on the order of tens milliseconds of shutter speed (i.e., the total time to open and close the shutter) for shutters in the size range of approximately ten to forty millimeters in diameter. For example, a shutter may have 25-mm in diameter and a 17.5-millisecond effective exposure time. Also, such a shutter may be operated at a maximum of 5 Hz (i.e., can only open and close 5 times per second). Such shutters are often used in experiments for imaging of a short event (e.g., on the order of tens to hundreds of nanoseconds). Short exposure times may be desired for a variety of reasons, including but not limited, to prevent motional blurring if something is moving fast, or to reduce luminous emissions if there is a very bright environment such as a flame or plasma.

Figure 3:
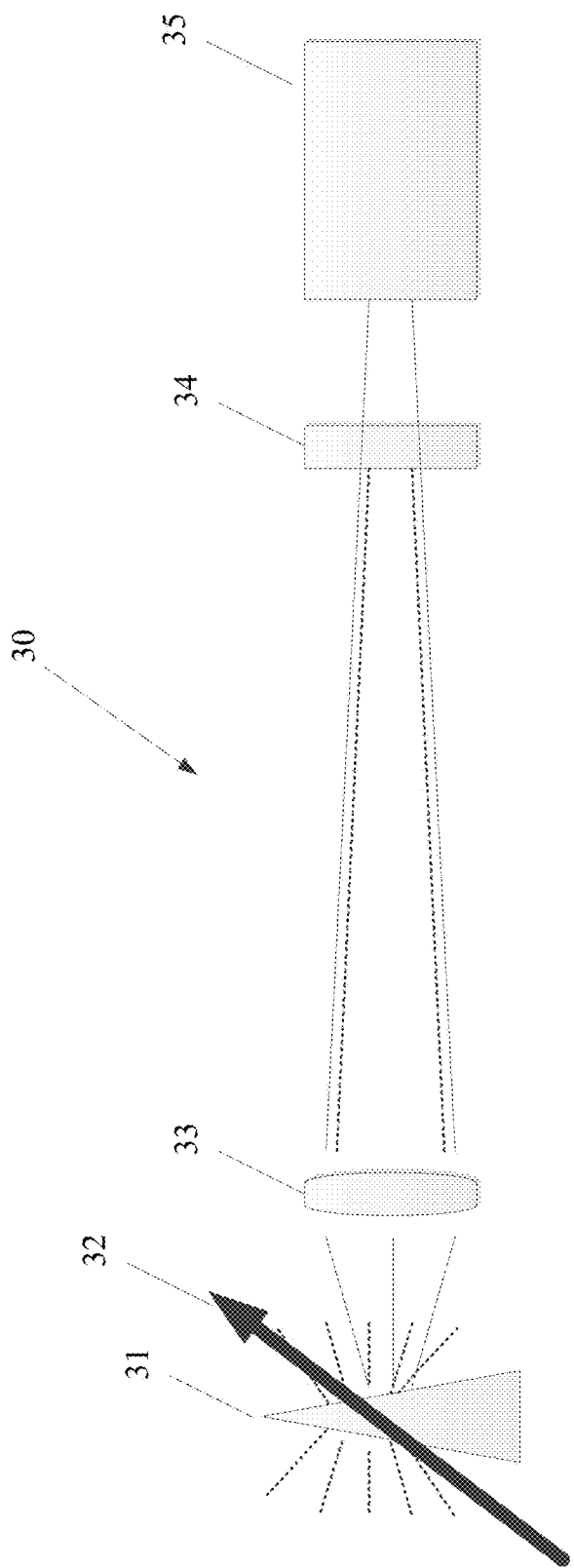
FIG. 3 is a schematic view of a known optical device employed in a scattering application.

Raman scattering, Rayleigh scattering, LIF, LII, or other isotopically scattered processes are some exemplary applications for optical shutters. With various scattering applications, a laser beam may be directed into a flame and resulting scattered light is collected by a lens and directed into the detector. As shown in FIG. 3, an optical device 30 includes a flame 31 with laser beam 32 being directed there through. A resulting scattered light is collected by lens 33 and then transmitted to detector 35 via shutter 34. In certain applications, luminosity from the flame or plasma may be of interest. For instance, it may be desired to reject this luminosity and only collect the Raman signal. This experiment may use a 10 Hz laser (i.e., pulsing every 100 milliseconds). In that case, a known optical device would suppress the background by a factor of 5.7 (computed by the ratio of 100 milliseconds in 17.5 milliseconds). By making the aperture smaller the shutter can be made faster. For example, a 2-mm diameter shutter may have an effective open time of 1.1 milliseconds. In accordance with various embodiments of the present disclosure, the background suppression could be improved, e.g., to nearly 90 (100 milliseconds in 1.1 milliseconds), but with a much restricted aperture which may attenuate the signal being detected.

While the above background suppressions and exposure times may be sufficient in some experiments, they are inadequate for many other applications. For example, in a Raman spectroscopy application, a 100-nanosecond signal may be desired to be detected. In this case, a 100-nanosecond exposure (open time) followed by a nearly 100-millisecond closed time may be desired, and the laser may typically be running at around 10 Hz. This desired shutter performance may not be achievable with the known optical device of FIG. 3. Such desired shutter performance would include a factor of 1 million background suppression. Moreover, such a shutter would only be fully effective if it had no time jitter between when it was triggered and when it opened. If there was time jitter, then the shutter would need to be opened as large as or larger than the time jitter to allow the shutter to transmit the light when the signal is to be collected.

Other devices include a fast mechanical shutter system which includes multiple spinning discs with slots in the discs. Such fast mechanical shutters for the entrance slit of a spectrograph are described in "A fast mechanical shutter for spectroscopic applications;" Miles, P. C.; Barlow, R. S.; Measurement Science & Technology, vol. 11, No. 4, pp. 392-397 (April 2000), which is incorporated by reference herein in its entirety. When the multiple slots align, they transmit light there through, with approximately 100% transmission rate. In the closed state, there is virtually infinite attenuation. This system provides a 9.1-microsecond exposure (with about 11,000 suppression factor) through a 0.8 millimeter slit width.

The optical signal may be brought to a focus somewhere along the optical path; for example, at the entrance slit to a spectrograph. Accordingly, the shutter need not block access to the full area of the detector, but only to a narrow region that corresponds to the width of the focused light field. Although rapid actuation may be achieved, the shutter is inherently a single-shot device and not suited for the typical 10 Hz repetition rate of laser-spectroscopic experiments. Fast shutters based on rapid thermal expansion of Ni—Cr wires have also been developed and offer the potential of achieving higher exposure times, but require periodic wire cooling times, which limits repetition rates and therefore results in only an order-of-magnitude improvement over large-format standard shutters. Electro-optical shutters based on ferroelectric liquid-crystal (FLC) polarization rotators, as well as Pockels cells as the active polarization-rotating elements, have been employed in certain application with an improved on-off time. However, there are additional difficulties associated with the high-voltage pulsing and long optical path through the cell. Another possible shutter design includes a rotating chopper wheel, with a peripheral slit that is greater than or equal to the width of the spectrograph entrance slit. Relatively slow-speed, chopper-based shutters have been employed and coupled with FLC-based shutters to improve the closed-state leakage of these devices.

A mechanical shutter for line-imaging measurements of spontaneous Raman scattering may employ a chopper-type shutter that gives exposure times of less than 10 seconds, has 100% optical transmission and has essentially zero leakage. The mechanical shutter device may further incorporate chopper-wheel-position sensing electronics to permit synchronous triggering of a laser source. There are many disadvantages of the above fast mechanical shutter system: is it is very large; it is very expensive to build; it is not commercially available; and it has a slow and non-adjustable repetition rate. Consequently this system has seen very limited use.

Liquid crystal shutters are another technology that has been used for some applications. These shutters have fast response time, are relatively inexpensive, and can operate at fast repetition rates. However, liquid crystal shutters do not transmit every color of light, e.g., ultraviolet light.

Figure 4:
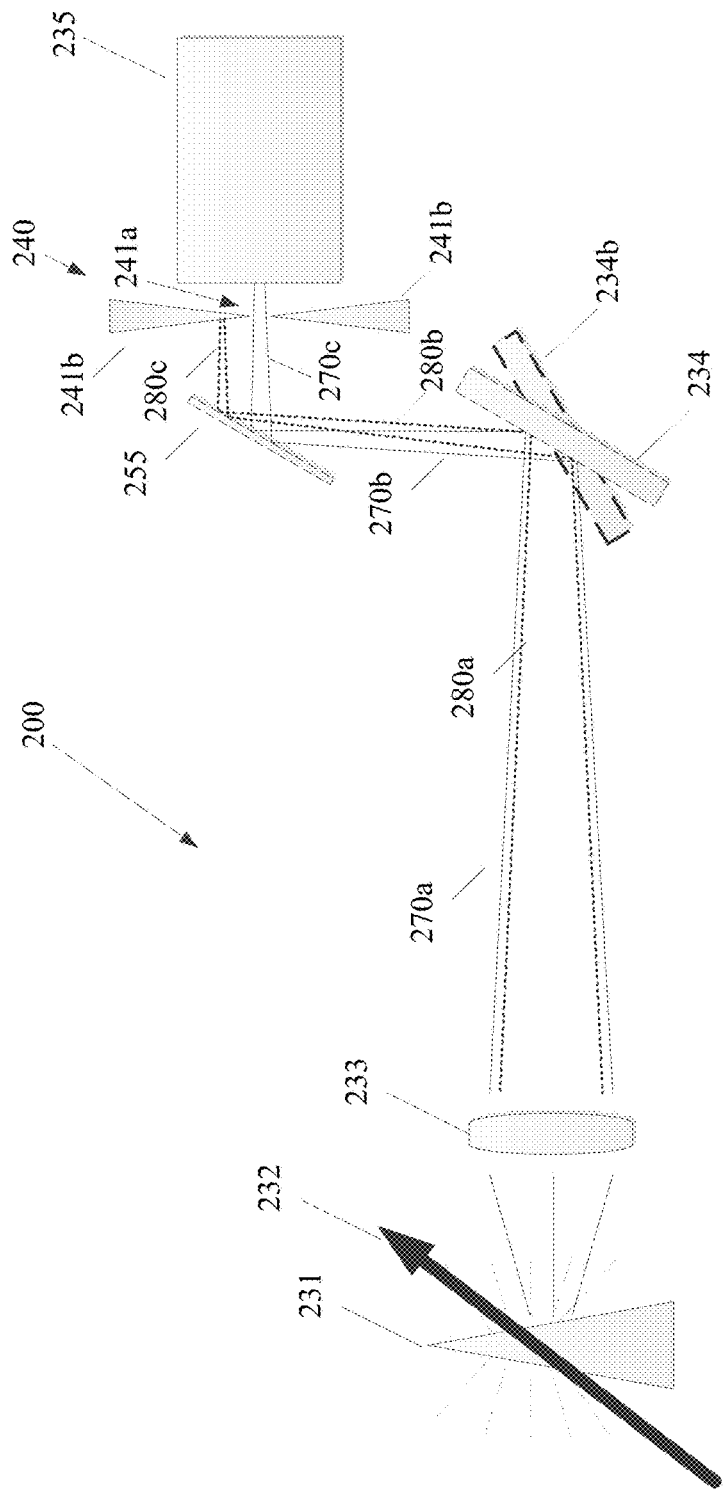
FIG. 4 is a schematic view of an optical device in accordance with another embodiment, employed in a scattering application.

An optical device 200 in accordance with the present disclosure, which may be used in various scattering applications including Raman scattering, is shown in FIG. 4. As shown in FIG. 4, optical device 200 includes a flame 231 with laser beam 232 being directed there through. After being collected by lens 233, the resulting collected light 270a/280a is then transmitted to digital micromirror device 234. The Raman scattered light would then reflect off digital micromirror device 234 and then off an optional normal reflective mirror 255 and to aperture 240 in front of detector 235. Similar to optical device 100 of FIG. 2, depending on where the light beam strikes the aperture 240, the light beam may be blocked by aperture segment 241b, e.g., as shown by light beam 280c, or the light beam may pass through aperture opening 241a to reach detector 235, e.g., as shown by light beam 270c. Specifically, digital micromirror device 234 may comprise at least one reflective surface and may be rotatable about a hinged point. When the digital micromirror device 234 is positioned at a first position, a deflected light beam 270b will be directed to mirror 255 and then reflected light beam 270c passes through the aperture opening 241a to detector 235 (shutter open), whereas when the digital micromirror device 234 is positioned as a second position (shown by position 234b), a deflected light beam 280b with be directed to mirror and then reflected light beam 280b is reflected at a different angle such that it will be directed to aperture segment 141b and not reach the detector (shutter closed). When the shutter is closed the detector 235 does not view the flame and luminosity is blocked. In a similar experiment known as coherent anti-Stokes Raman spectroscopy (CARS), the laser signal beam is a coherent, laser-like beam and optical device 200 operates the same way for CARS as Raman scattering.

Optical devices according to various embodiments of the present disclosure for use in optical shutters have the benefit of short gate exposures for improved background suppression. As shown in Table 1, a 24-mm aperture sized shutter used in an optical device in accordance with at least one embodiment of the present disclosure would have an effective open time as short as 0.02-milliseconds, which is nearly 900 times faster than a traditional mechanical 25-mm diameter shutter.

TABLE 1

|  | Mechanical shutter, 25 mm diameter | Optical Device with DMD, 24 mm diameter |
|---|---|---|
| Aperture size | 25 mm | 24 mm |
| Effective open time (ms) | 17.5 | 0.02 |
| Delay time after trigger (ms) | 3 | very small (est. << .04 ms) |
| Rep rate (kHz) | 0.005 | 23 |
| Rep rate in time (ms) | 200 | 0.0435 |
| Best background suppression for 10 Hz laser operation | 5.71 | 5,000 |

Optical devices in accordance with the present disclosure also have the benefit of a fast repetition rate. For example, optical devices disclosed herein can operate (turn on and off) at a rate of between 4 kHz and 32.5 kHz. As shown in Table 1, an exemplary optical device is accordance with the present disclosure is shown operating at 23 kHz. For Raman spectroscopy, a 10 Hz laser is typically used, thus resulting in a factor of 5,000 suppression of background light, whereas the same sized conventional mechanical device only rejects a factor of 5.71. Accordingly, optical devices discussed herein may have a nearly 3 order of magnitude improvement. Another advantage of a fast repetition rate is when used with higher repetition rate lasers. For example, some lasers may operate at up to and exceeding a 1-MHz repetition rate. There are many applications in the range of 1-20 kHz for, e.g., PIV lasers and femtosecond lasers, in which optical device of the present disclosure may be employed.

Large apertures may be employed with optical device as discussed herein. For example, chip sizes up to 0.95 inches may be employed, which are comparable to leaf petal shutters and much larger than the fast mechanical shutters discussed herein. High efficiencies are another benefit. For example, digital mirror devices as discussed herein may have a 91% fill factor and thus have up to 80-90% efficiency if the input/output window is anti-reflection coated and the mirrors have approximately 95% efficiency. Efficiency of the device may be reduced by approximately as much as 40% if the window is not anti-reflection coated, depending on the angle of incidence used and the polarization of the incoming light. Reflective losses from non-anti-reflection coated windows may be significantly reduced when using polarized laser beams by directing the laser beams into the device at Brewster's angle (approximately 56 degrees for glass). Low cost is an additional benefit, particularly if the optical devices discussed herein are made in bulk. Additionally, there are few or no large moving parts. While the mirrors of the digital micromirror device do have some amount of movement, this movement is very small in comparison is other optical shutter devices and further, the digital micromirror device is associated with being well designed, high quality, robust and long-lived. Digital micromirror devices (based on their used in many other consumer products) have a much longer lifetime than conventional shutters which have numerous large moving parts that can wear and run out of lubrication. Further, two optical devices in accordance of the present disclosure could be put in series to make the system even faster. The two optical devices may be staggered in time to make a minimum on time for the pair of shutters.

Another application of optical devices as discussed herein is in the area of imaging, both for consumers and scientific imaging. Short-exposures can be used to prevent blurring (e.g., to freeze the image or to freeze the flow in fluid dynamics applications). A common example is laser induced fluorescence experiments where short exposure times can freeze the flow. In other applications, background light suppression as discussed above is also desired. In this embodiment, one or more of digital micromirror device could be used, in combination with apertures, to make a short camera exposure. If further miniaturized, the optical device may be mounted inside the camera body and sold on commercial cameras.

Yet another application for a shutter optical device according to the present disclosure, is for laser safety where laser beam may be blocked by a laser safety system (typically when an interlock is broken through or when a panic button is activated). Typically an obstruction such as a piece of metal will be inserted into laser beams block the beam, or if the laser energy is high and could damage the obstruction, a mirror may be mounted on a lever and be directed into the laser beam to direct the laser beam to a beam dump which safely and absorb the energy. Such components may be incorporated into optical device, e.g., into the laser itself.

Modulator Applications

Optical devices in accordance with the present disclosure may also be used to temporally or spatially modulate a light beam or laser beam. For example, a square hat profile beam may be generated temporally using the configuration shown in FIG. 2, by providing the digital micromirror device 120 with a simple square pulse electrical signal to all the pixels. However, more sophisticated temporally shaped light pulses could also be produced by selectively turning on or off different pixels of the digital micromirror device 120. For example a saw-tooth profile may be produced by turning on all the pixels and then turning off 1% of randomly selected pixels, then another 1% of the pixels, and so on until the transmitted intensity drops to zero and then repeating. The processed light beam may then have a saw-tooth, sinusoidal, square top hat, random, or any other time-domain signal imposed on it.

Similarly, spatial information may be encoded on the laser or light beam. For example, two side by side beams may be generated by fully illuminating the digital micromirror device and alternately shuttering the top and bottom halves of the mirror. Similarly an arbitrary pattern of spatial modulation of light may be generated. These spatial and temporal modulations may be combined as well to encode more information on the light or laser beam. Applications of spatial and/or temporal modulation may include optical transmission of data including images, audio, video or archival ones and zeros for data storage. An advantage of this type of data transfer is that no plug may need to be attached. Thus, an all-optical method of transmitting data from one optical device to another may be employed.

Chopper Applications

One application of temporally encoding information on a laser or light beam is in lock-in detection. In known configurations, this is typically performed when a laser or light beam passes through a chopper wheel (a spinning metal disk with holes in it). The chopper wheel may spin at a certain frequency which varies slightly and therefore must be measured continuously. The laser or light beam is then chopped at a certain frequency determined by the number and spacing of the holes, and the speed of the disk. This beam is then processed, for example passed through an unknown sample of a substance that is being studied. A detector may then measure that signal and use lock in electronics to detect only the oscillating signal. Thus, the laser signal is detected even in a background of large amplitude white noise, luminosity, or detector noise. This so-called lock-in detection is widely used in scientific experiments (e.g., physics, chemistry, and engineering) and industrial applications but the lock-in device that encodes the laser beam is a mechanical device that spins and may therefore be difficult to control. For example, currents in the room can vary the frequency of the spinning wheel, creating dispersion in the data and also preventing the experiment from being synchronized, for example, with a pulsed laser that may interrogate the flow being studied. Additionally, the chopper wheel may have large moving parts that can wear out.

Accordingly, an optical device in accordance with the present disclosure, e.g., as shown in FIG. 2, may be implemented in a chopper application. However, after aperture 140, the light beam is directed to a sample of at least one composition of matter or an experiment before going on to detector 130. An advantage of such a configuration is improved frequency stability and much higher frequencies than can be produced with the above-described mechanical chopper wheel. Another advantage is that chopper wheels are only capable of creating square wave or sinusoidal time-series oscillations whereas chopper applications according to the present disclosure may be configured to create arbitrary time series patterns that may be searched for in a detection algorithm.

Deflector Applications

Beam deflectors, slicers and shapers are a class of optical devices that cause a laser beam to have a change in optical path, angle, intensity and/or color (frequency). Examples include acousto-optic and electro-optic modulators (AOMs and EOMs) and Pockels cells, which may be combined with apertures, waveplates and/or polarizers. These devices may be used to switch beams into and out of laser cavities or down laser paths. In a typical application acousto-optic modulators may be controlled to deflect a laser beam to a certain angle and at a certain frequency. This may then slightly shift the frequency of the laser, which may or may not be desirable, depending on the application. Additionally, such existing optical modulator devices may be relatively expensive and bulky.

In accordance with the present disclosure, an optical device, e.g., as shown in FIG. 2 with a digital micromirror device 120 and aperture 140, may be used in such application, and may thus allow a laser beam to be deflected, chopped (sliced) or shaped spatially or temporally. Unlike known deflectors, the optical device 100 does not shift the frequency, which may be desirable in certain applications. Additionally, optical devices in accordance with the present disclosure may be used as deflectors and thus may replace such existing optical modulator devices, and may be smaller, less expensive and more efficient than such existing optical modulator devices.

Additional modification may allow for an even more compact device. For instance, the digital micromirror device may be moved closer to the lens, with a lens of an adjusted focal point. Using optical fibers instead of allowing the laser beams to travel through air may allow the device to be more compact and allow more control as to where the beams are overlapped. Additionally, increasing the maximum frequency of the digital micromirror device allow for the device to measure higher associated velocities.

While AOM, EOM or Pockel cell devices may be used in such applications, these devices are relatively more expensive methods of generating laser pulses compared to optical devices of the present disclosure. Once the low energy pulses are created they may be amplified by several amplifier stages, creating a sequence of high energy laser pulses. For example a sequence of one thousand 10-ns-duration pulses may be created at a 10 kHz rate. During this amplification process noise (amplified spontaneous emission, ASE) may be generated temporally in between the pulses. This noise may be amplified, thus taking gain away from the pulses that are being amplified and reducing the efficiency of the laser. However, one or more optical devices in accordance with the present disclosure may be implemented between the amplification stages to reduce this amplified noise and therefore improve laser efficiency and reduce laser cost, for example in a multi-amplifier laser such as a pulse burst laser or a conventional Nd:YAG laser.

An advantage of employing one or more optical devices disclosed herein inside of a laser oscillator, amplifier laser system or any other laser system is that the temporal and spatial modulation properties of the above-discussed digital micromirror device chip may be used to control the temporal or spatial mode of the beam. For example, a mirror pattern may be oriented in a particular spatial pattern to generate different spatial modes of the laser. This may be accomplished dynamically as the laser is operating, for example, with successive pulses having different spatial modes. One application of configuration may be a laser having different focusing characteristics when the laser is then focused by a lens. If different mode shapes of the beams are imprinted on the beam, different spot sizes may be obtained. This may be particularly useful in laser cutting and welding applications or laser surgery where precise control of the laser fluence, shape, and spot size are critical.

The spatial and temporal control of the laser pulse may also be employed with an optical device of the present disclosure, for laser cutting, welding and surgical applications. For example, a high powered continuous laser beam may be modulated in time or space to generate different levels, spatial patterns and time-sequences of illumination. Pulsating patterns may be produced to encourage the flow of material, e.g., materials being welded, or to force blood, medicine or DNA flow or movement in a surgical application.

One or more optical devices in accordance with the present disclosure may have a high damage threshold. Accordingly, portions of the optical device, e.g., the digital micromirror device and the aperture, maybe positioned inside or outside the laser. However, if placed inside the laser, near the oscillator, the digital micromirror device chip may not necessarily experience as high laser fluence as it would after pulse amplification.

All references contained herein are hereby incorporated by reference in their entirety.

In keeping with the foregoing discussion, the terms "optical device" or "optical shutter device" is intended to encompass a shutters, choppers, modulators, deflectors and the like, vis-à-vis the methods and examples of the present disclosure.

While preferred embodiments and example configurations of the invention have been herein illustrated, shown and described, it is to be appreciated that various changes, rearrangements and modifications may be made therein, without departing from the scope of the invention as defined by the claims. It is intended that specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention.

While the invention has been described with respect to specific examples including presently preferred modes of carrying out the invention, those skilled in the art will appreciate that there are numerous variations, combinations, and permutations of the above described systems and methods. Those skilled in the art will understand that various specific features may be omitted and/or modified in without departing from the invention. Thus, the reader should understand that the spirit and scope of the invention should be construed broadly as set forth in the appended claims.

What is claimed is:

1. An optical device comprising:
   a light source configured to project a light beam;
   a detector configured to detect an incident light beam projected from the light source;
   a mirrored device disposed at a position between the detector and the light source, such that it is configurable to deflect the light beam projected from the light source as it travels towards the detector; and
   an aperture disposed in front of the detector and configured to block an incoming light beam from reaching the detector when the incoming light beam is incident on the detector outside of a passable incident range and including an aperture opening configured to pass the incoming light beam to the detector when the incoming light beam is incident on the detector within a passable incident range,
   wherein the mirrored device is configured to rotate between a first position and a second position, the first position configured to cause the light beam to pass through the aperture opening to the detector, and the second position configured to cause the light beam to be blocked by the aperture; and
   wherein the light beam comprises a continuous wave beam, and wherein the mirrored device is configured to oscillate such that the continuous wave beam is chopped into a series of laser pulses.

2. The optical device of claim 1, wherein the mirrored device includes an optical shutter to deflect the incoming light beam to the detector via the aperture at a repetition rate between 0.1 hertz and 32 kilohertz.

3. The optical device of claim 2, wherein the optical shutter is configured to reject ambient light.

4. The optical device of claim 1, wherein the light source includes a laser beam directed into a flame and a lens configured to collect scattered light from the laser beam passing through the flame and to direct the scattered light to the detector.

5. The optical device of claim 4, further comprising a mirror disposed between the mirrored device and the detector, the mirror being configured to deflect the scattered light collected by the lens toward the detector.

6. The optical device of claim 4, wherein, when the mirrored is positioned in the second position, luminosity from the flame is blocked from entering the detector.

7. The optical device of claim 1, wherein the light beam operates at a repetition rate between 0.1 Hz and 32 kilohertz.

8. The optical device of claim 1, further comprising a camera body housing each of the detector, the light source, the mirrored device and the aperture, and wherein the optical device is configured for imaging.

9. The optical device of claim 1, further comprising a laser beam safety system configured to selectively block the light source from the mirrored device.

10. The optical device of claim 1 wherein:
the digital micromirror device includes a plurality of mirrors arranged in an array;
era rotating the digital micromirror device between the first position and the second position, the plurality of mirrors are rotated at respective pivot points; and
the respective pivot points of the plurality of mirrors are located in a single fixed plane.

11. An optical device system comprising:
a plurality of optical devices including at least a first optical device and a second optical device, the plurality of optical devices connected in a series configuration, and each comprise:
a light source configured to project a light beam;
a detector configured to detect an incident light beam projected from the light source;
a mirrored device disposed at a position between the detector and the light source, such that it is configurable to deflect the light beam projected from the light source as it travels towards the detector; and
an aperture disposed in front of the detector and configured to block an incoming light beam from reaching the detector when the incoming light beam is incident on the detector outside of a passable incident range and including an aperture opening configured to pass the incoming light beam to the detector when the incoming light beam is incident on the detector within a passable incident range,
wherein the mirrored device is configured rotate between a first position and a second position, the first position configured to cause the light beam to pass through the aperture opening to the detector, and the second position configured to cause the light beam to be blocked by the aperture; and
wherein the light beam comprises a continuous wave beam, and wherein the mirrored device is configured to oscillate such that the continuous wave beam is chopped into a series of laser pulses.

12. An optical device comprising:
a detection system including a light beam receiving portion configured to detect a light beam;
a digital micromirror device configured to deflect a light beam toward the detection system; and
an aperture disposed proximate to the light beam receiving portion, the aperture including an aperture opening configured to allow passage of the light beam deflected from the digital micromirror device to the detection system and an aperture segment configured to block passage of the light beam deflected from the digital micromirror device from the detection system,
wherein the digital micromirror device is configured adjust between at least a first position and a second position, the first position configured to cause the light beam to pass through the aperture opening to the detection system, and the second position configured to cause the light beam to strike the aperture segment; and
wherein the light beam comprises a continuous wave beam, and wherein the digital micromirror device is configured to oscillate such that the continuous wave beam is chopped into a series of laser pulses.

13. The optical device of claim 12, wherein the digital micromirror device is configured temporally or spatially modulate the light beam.

14. The optical device of claim 13, wherein the digital micromirror device is configured to control a temporal or spatial mode of the light beam.

15. The optical device of claim 13, wherein a temporal or spatial modulation of the digital micromirror device corresponds to encoded information.

16. The optical device of claim 15, wherein the encoded information represents at least one of an image, an audio, a video, or an archival for data transmission and/or data storage.

17. The optical device of claim 12, further comprising a sample comprising at least one composition of matter, wherein the light beam passes through the sample before being passed to the detection system.

18. The optical device of claim 17, wherein detection system include a look-in electronics system to detect an oscillating signal passing through the sample.

19. The optical device of claim 17, further comprising at least one amplifier stage for amplifying the laser pulses.

20. The optical device of claim 17, wherein the digital micromirror device is configured to reduce amplified spontaneous emission (ASE) in a laser.

* * * * *